United States Patent [19]

Newton et al.

[11] Patent Number: 4,558,920

[45] Date of Patent: Dec. 17, 1985

[54] TAPPED OPTICAL FIBER DELAY LINE

[75] Inventors: Steven A. Newton, Menlo Park; John E. Bowers, Mountain View, both of Calif.

[73] Assignee: Board of Trustees of the Leland Stanford Junior University, Stanford, Calif.

[21] Appl. No.: 323,038

[22] Filed: Nov. 19, 1981

[51] Int. Cl.[4] .............................................. G02B 5/172
[52] U.S. Cl. ............................... 350/96.15; 350/96.16; 250/227
[58] Field of Search ................ 156/637, 643; 250/227; 350/96.15, 96.16, 96.19, 96.20

[56] References Cited

U.S. PATENT DOCUMENTS

| | | | |
|---|---|---|---|
| 3,548,189 | 12/1970 | Meinel et al. | 156/643 |
| 3,592,773 | 7/1971 | Müller | 156/637 |
| 3,704,060 | 11/1972 | McNaney | 350/336 |
| 3,773,289 | 11/1973 | Gloge | 250/211 J |
| 3,777,149 | 12/1973 | Marcatili | 350/96.15 |
| 3,785,716 | 1/1974 | Maurer | 350/96.29 |
| 4,019,051 | 4/1977 | Miller | 250/227 |
| 4,021,097 | 5/1977 | McMahon | 350/96.15 |
| 4,076,375 | 2/1978 | Muska et al. | 350/96.15 |
| 4,079,404 | 3/1978 | Comerford et al. | 350/96.18 |
| 4,136,929 | 1/1979 | Suzaki | 350/96.15 |
| 4,145,457 | 3/1979 | Kersten | 427/38 |
| 4,159,418 | 6/1979 | Marom | 250/199 |
| 4,165,150 | 8/1979 | Duck et al. | 350/96.15 |
| 4,261,640 | 4/1981 | Stankos et al. | 350/96.15 |
| 4,277,134 | 7/1981 | Upton, Jr. | 350/96.20 |
| 4,296,319 | 10/1981 | Franks et al. | 350/96.15 |
| 4,342,499 | 8/1982 | Hicks, Jr. | 350/96.15 |
| 4,386,822 | 6/1983 | Bergh | 350/96.15 |

FOREIGN PATENT DOCUMENTS

| | | | |
|---|---|---|---|
| 2930454 | 2/1981 | Fed. Rep. of Germany . | |
| 3008051 | 9/1981 | Fed. Rep. of Germany . | |
| 3038048 | 10/1981 | Fed. Rep. of Germany | 350/96.15 |
| 24539 | 2/1977 | Japan | 350/96.15 |
| 91752 | 11/1978 | Japan | 350/96.15 |
| 11432 | 2/1981 | Japan | 350/96.16 |

OTHER PUBLICATIONS

Hsu, H. P. and Hilton, A. F., "Single Mode Optical Fiber Pickoff Coupler," *Applied Optics*, vol. 15, No. 10, Oct. 1976.
Miller, C. M., "Fiber-Optic Array Splicing with Etched Silicon Chips", *Bell System Technical Journal*, vol. 57, No. 1, Jan. 1978, pp. 75–77.
Schroeder, C. M., "Accurate Silicon Spacer Chips for an Optical-Fiber Cable Connector", *Bell System Technical Journal*, vol. 57, No. 1, Jan. 1978, pp. 91–97.
Chang, C. T. et al., "Fibre-Optic Delay-Line Devices for R.F. Signal Processing", *Electronics Letters*, vol. 13, No. 22, Oct. 1977, pp. 678–680.
Marom, E., "Optical Delay Line Matched Filters", *IEEE Transactions on Circuits and Systems*, vol. CAS-25, No. 6, Jun. 1978, pp. 360–364.
*Fiber Optics*, by B. Bendow and S. Mitra, Plenum Press, New York, 1979, pp. 616–622.
*Optical Fibers for Transmission*, by John E. Midwinter, John Wiley and Sons, New York, 1979, pp. 8–9.
*Introduction to Optical Fiber Communications*, by Y. Suenatsu and K. Iga, John Wiley and Sons, New York, 1982, pp. 50–51, 114–115 and 136–137.

*Primary Examiner*—William L. Sikes
*Assistant Examiner*—Frank González
*Attorney, Agent, or Firm*—Knobbe, Martens, Olson & Bear

[57] ABSTRACT

A fiber optic tapped delay line is disclosed which has a number of taps simultaneously fabricated in a single length of optical fiber. The light output from each tap is detected by either an electronic photodetector or by an output segment of optical fiber having a lapped surface, the latter technique also being utilizable in the mass production of optical couplers. The device may be used as a transversal filter by summing the outputs from the taps, and the frequency passband may be custom-tailored by selectively weighting the outputs from individual taps.

40 Claims, 19 Drawing Figures

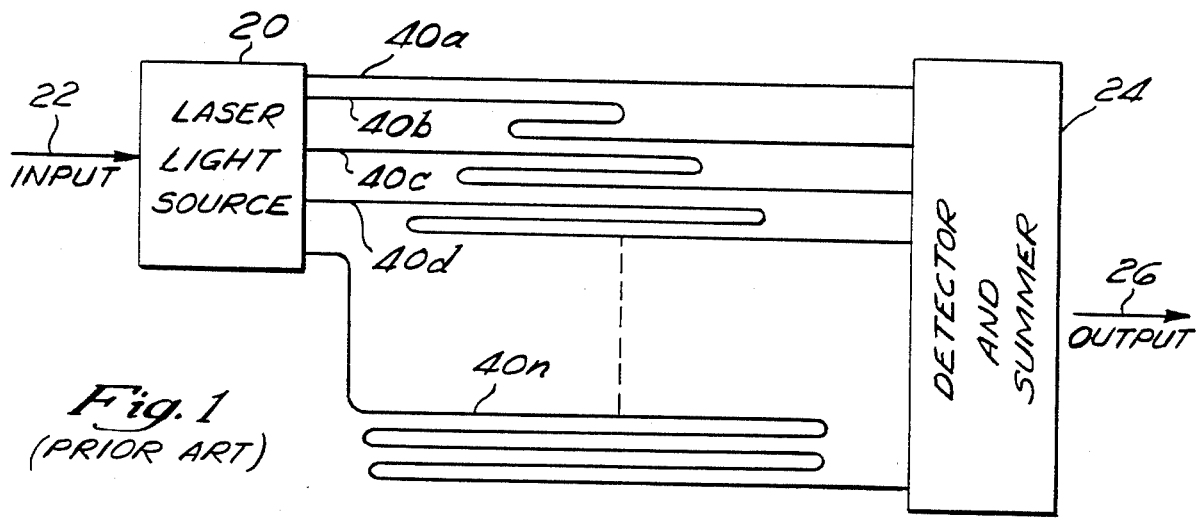
Fig. 1 (PRIOR ART)
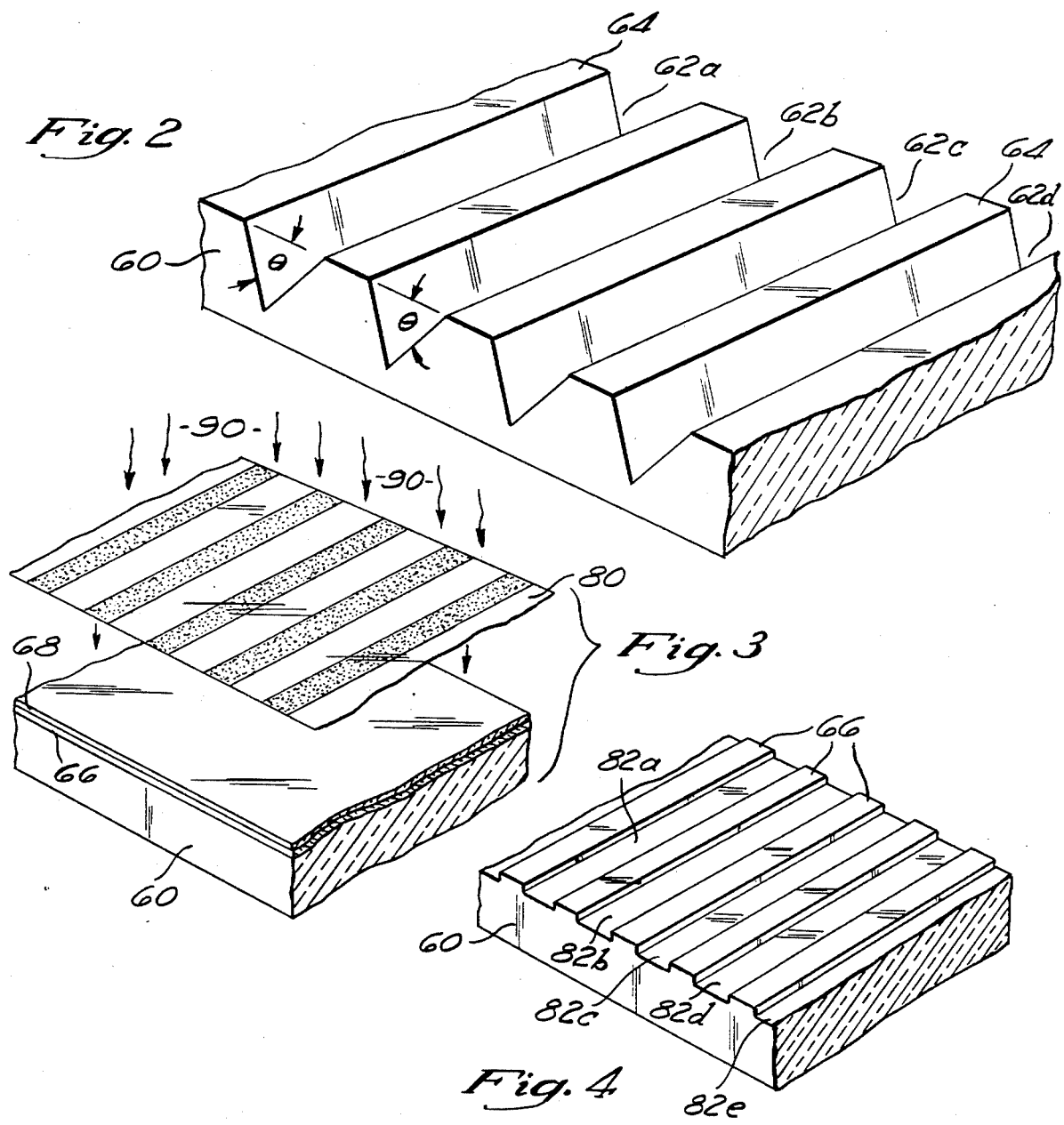
Fig. 2
Fig. 3
Fig. 4

TAPPED OPTICAL FIBER DELAY LINE

BACKGROUND OF THE INVENTION

In communication and control systems, delay lines are used to store a signal for a discrete period, and to supply that signal at an output point at the end of the period. This period between the time the signal is input and the time the signal is output is called the delay time. A tapped delay line is a variation in which the signal is supplied at several different output points, the distance between successive output points being that distance which will provide a delay time equal to the period of the fundamental frequency of the device. Tapped delay line applications include use in correlating and convoluting devices.

If an input signal which varies as some function of time is supplied to the input of the tapped delay line, the tapped delay line may be used to filter selected frequencies from the input signal. By summing the outputs of the tapped delay line, the device will attenuate any input signal content other than of the fundamental frequency, or that fundamental frequency's harmonics.

For example, by making the period between the several output points five microseconds, a fundamental frequency having a five microsecond period will be provided at the summed output, along with the various harmonics of that fundamental frequency. For the five microsecond period, the fundamental frequency would be 200 KHz. When a tapped delay line is used in this way to pass some frequencies and reject others, it is acting as a transversal filter.

There are three basic types of delay lines which may act as transversal filters. The first type comprises a group of devices utilizing wave phenomena in which waves may reinforce to cause the device to act as a transversal filter. The second type utilizes a considerable length of transmission medium with the signal being removed at taps which are separated by equal lengths of the transmission media, these signals then being summed to provide the desired system output. The third type of system recirculates the signal to allow the desired fundamental and harmonic frequencies to reinforce themselves, with the resulting output being in effect already summed by the recirculating action.

The first group are those devices utilizing wave phenomena to obtain a similar output. Many of these devices use coaxial cables or acoustic wave guides for the transmission and summation of signals. The time delay in these devices is produced because of the time a signal takes to travel through the delay line from the input end to the output end. Portions of the signal will be reflected and will propagate from the output end back to the input end, where they are reflected to the output end again. Where an input function is continuously supplied, these devices will reinforce the signal at some fundamental frequency and that frequency's harmonics, while attenuating all other frequencies, and will provide at the output end a signal comprising the fundamental and harmonic frequency content of the input signal.

The coaxial cable delay line is the most common of these devices, and microwave signals may be stored in coaxial cables for some period of time. The main disadvantage of coaxial cables is that they have a fairly limited bandwidth, making coaxial cable useless at high frequencies and with short pulses.

At frequencies above 100 MHz, coaxial cable is subject to severe loses, and high frequencies will thus not be transmitted accurately. In addition, if the pulse being transmitted is of extremely short duration, e.g., one nanosecond, it will be degraded and spread out rather than remaining sharp.

Coaxial cable is also susceptible to electromagnetic interference, particularly when the frequencies being transmitted are relatively high. Finally, fairly long lengths of coaxial cable may be necessary to allow the device to function as a transversal filter at lower frequencies, and such devices are quite bulky and also fairly expensive.

Another type of device utilizing wave phenomena is the acoustic delay line device. There are two types of acoustic delay lines: bulk-wave devices, and surface-wave devices. Bulk-wave devices use the principle of compression and rarefaction of the bulk material, and have input and output transducers at the ends of the bulk material. Bulk-wave devices, unfortunately, require large bias voltages and thus present a heat dissipation problem, so that only pulsed operation of bulk-wave devices is feasible.

Surface-wave devices operate with acoustic surface waves, and utilize charge carriers in a thin film of silicon placed adjacent to an insulating piezoelectric crystal. Surface acoustic wave devices operating at UHF frequencies have been developed and operate with multiple taps installed in the transmission medium. The main disadvantage of such devices is that their upper operational frequency limit is approximately one GHz, and it is desirable to have a transversal filter which is operable at higher frequencies. Therefore, it can be seen that devices utilizing wave phenomena are not very satisfactory when used as transversal filters at high frequencies.

Tapped delay lines having a number of taps at different lengths of the transmission medium are generally of two types: electrical, and optical fiber. The electric tapped delay line is simply a long segment of wire with outputs at multiple points along this wire. The fundamental frequency of such a tapped delay line is selected by a uniform length of wire between outputs, the time an electrical impulse takes to travel from one output to the next such output being the period of the fundamental frequency. Such devices are fairly bulky and expensive, since the requirement of having hundreds or possibly even thousands of outputs means that fairly large lengths of wire will be needed. Such devices also have a severe limitation in their operational bandwidth, and are generally not operable at high frequencies or in an environment having a not insubstantial amount of electromagnetic interference.

The optical fiber type of tapped delay line has significant advantages in that it is not susceptible to electromagnetic interference, is operable at relatively high frequencies, and optical fiber is substantially less bulky than wire. However, in order to obtain performance over a wide range of frequencies from existing optical fiber devices, hundreds or even thousands of optical taps must be utilized. This can be done with current technology by fabricating discrete couplers at each tapping point. Such a system is not really feasible in that it is extremely difficult to construct, quite expensive, and would be difficult to accomplish without lowering the signal level substantially. However, the concept of sampling the signals in an optical fiber at discrete intervals is an important one, and will be utilized by the present invention.

Another type of optical fiber tapped delay line is one which uses multiple segments of optical fiber, each segment being a standard length longer than the preceding segment, the standard length being the length through which light travels in one period of the fundamental frequency. The signal being analyzed is introduced into these segments simultaneously, and the outputs of each of these segments is summed to produce an output signal comprising the fundamental and harmonic frequency content of the input signal.

While this device accomplishes the desired result, it presents the substantial problem of necessitating an input signal to be simultaneously supplied to hundreds or even thousands of optical fiber segments. Such a device would be difficult to construct, and would also be somewhat bulky.

Each of the above optical fiber devices also presents the disadvantage of not being able to change the tap weighting dynamically without extensive modifications to the device. In other words, once such a device is constructed, the relative weighting of various outputs which are to be summed may not be changed in order to tailor the output signal of the device.

The second type of tapped delay line is a recirculating memory type device, such as that described in U.S. Pat. No. 4,473,270, entitled "Splice Free Fiber Optic Recirculating Memory," and assigned to the assignee of the present invention. Such device operates in a way quite similar to the wave phenomena devices described above—a signal recirculates through a fiber optic loop in the recirculating memory devices, with the output of the device being a summed signal comprising the system-set fundamental and harmonic frequency content of the input signal, with all other frequencies being attenuated. The fundamental frequency has a period equal to the time taken for a signal to make one circulation through the loop.

Such devices have the advantages of being operable at high frequencies, being unaffected by electromagnetic interference, and being fairly compact. However, when used as a transversal filter, such devices have several disadvantages. First, in order to obtain an output signal of a usable level, recirculating memory devices can only provide a fairly limited number of circulations before the signal level drops below the usable level. This is a particular problem since it is desirable to have hundreds or even thousands of points at which the signal is taken and summed in order to obtain an accurate and sharply defined passband. A second substantial disadvantage of such devices is that there is no way to change the dynamic weighting of the output signals taken at various points before they are summed, since the summing is done within the device. Finally, since recirculating memory devices have a fixed loop length, there is a limitation on the length of signals input to such devices.

Therefore, there is a need for a device which has a large number of discrete taps, each tap being capable of removing the signal at some discrete point in the delay line. Each of the tapped outputs should be discrete, so that dynamic weighting of the outputs may be accomplished in order to tailor the resulting output of the system when the signals are summed. For example, by weighting the various output signals, a more nearly rectangular band for a transversal filter may then be obtained.

SUMMARY OF THE INVENTION

The invention is a tapped optical fiber delay line utilizing a large number of revolutions of optical fiber with a portion of each revolution glued into the next of a number of parallel v-grooves in a plate or chip. If the device is to be used as a transversal filter, the length of each revolution is identical, with that length determining the fundamental frequency of the device. A portion of the cladding on each revolution of the optical fiber mounted on the plate or chip is removed along a lateral line normal to the revolutions of fiber in the v-grooves, thereby simultaneously creating a tap in each revolution where the line crosses that revolution. By removing a portion of the cladding from each revolution of optical fiber along this line, each of the multiplicity of taps will be separated by a length equal to the length of one revolution in the transversal filter application.

By removing only a small portion of the cladding at each tap location, only a small portion of the light will be removed from the fiber at each tap. The light at each tap is removed or detected in one of two ways. In the preferred embodiment, photosensitive semiconductor devices are used at each tap, so that the signal at each tap may be individually detected. The amplitude of the output of each photodetector may then be controlled by a field effect transistor (FET) to dynamically change the weighting of the various taps. By changing the weighting of the various taps, the frequency response of the system may be tailored. By changing which taps are used, the fundamental frequency of the device may be varied. For example, if every other tap is weighted at zero, the fundamental frequency is halved. When an input signal is supplied to one end of the fiber and the outputs of the dynamically controlled photosensors are summed together, the resulting system output will be a signal comprising the fundamental and harmonic frequency content of the input signal.

A second technique of detecting the light at each tap involves using a multiplicity of segments of optical fiber instead of the photodetectors, and, in effect, constructing a coupler at each tap location. The outputs of these fibers may then be weighted if desired, and summed to produce the output signal.

The optical fibers are preferably mounted so that the distances between successive revolutions of the fibers at the point where they are to be tapped is identical. In addition, the level at which the fibers are mounted at the location where they are to be tapped coincides with the lateral line normal to the v-grooves, since in the tapping process a portion of the cladding is removed by lapping the surface of the fibers. Since the lapping operation simultaneously removes a portion of the cladding on each revolution of the fibers wound around the core, the fibers are mounted at the same level so that an identical amount of cladding is removed from each revolution of the fibers, thus creating a number of identical taps.

In order to perform the lapping operation on the portions of each revolution of fiber which are to have some of the cladding removed, that portion of the fiber should be fixedly mounted. The preferred way to do this is by utilizing silicon chips having grooves etched into them. Since it is possible to etch the silicon chips by using photolithographic methods and to obtain a high degree of accuracy in the etching operation, such a method is the preferred embodiment. The use of grooves etched into a silicon chip to orient the revolutions of optical fiber is also useful in that it allows for highly accurate placement of either the photosensitive elements or the optical fiber coupler leads in a way ensuring they are correctly oriented in order to insure proper operation of the taps.

This device possesses several advantages over the other devices described above. Since it is a fiber optic device, it is operable at very high frequencies, unlike the wave phenomena devices and the other non-optical devices described above. Since the optical frequencies may be of the order of $10^{14}$ Hz, frequencies several orders of magnitude higher than 1 GHz may be modulated onto the optical carrier frequencies used. By using single mode optical fiber as the delay medium, high frequency information may be transmitted without suffering significant signal degradation.

The present invention has an advantage over all of the other devices described above in that it is possible to obtain a very large number of taps, i.e., hundreds or thousand of taps, from a single relatively compact device, and at a relatively modest cost of construction. Since all of the taps are formed in a single operation, a large number of taps having uniform characteristics may be simultaneously manufactured, a requirement for accurate operation of the device.

Another significant advantage of the present invention is that it is able to change the weighting of the various taps dynamically. As mentioned above, this is a highly desirable characteristic since a relatively accurate tailoring of the frequency response can be obtained. The device also has several advantages since it embodies single mode optical fiber. Because of the low dispersion characteristics of single mode fiber, signals with high frequency content may be transmitted accurately by the device. Also, since evanescent field coupling is utilized (as opposed to lapping into the core of the fiber), the present invention provides a more efficient, stable, and controllable tapping of the optical fiber, and thus a greater degree of control over the operating characteristics of the device.

These and other advantages of the present invention are best understood through reference to the drawings, in which:

FIG. 1 shows a prior art optical fiber delay line transversal filter;

FIG. 2 is a perspective view of a portion of the grooved chip used to properly align the optical fiber windings;

FIG. 3 is a perspective view illustrating the photolithographic technique utilized to achieve precise alignment of the v-grooves;

FIG. 4 is a perspective view of a portion of the silicon wafer ready to be etched;

Figure 13:
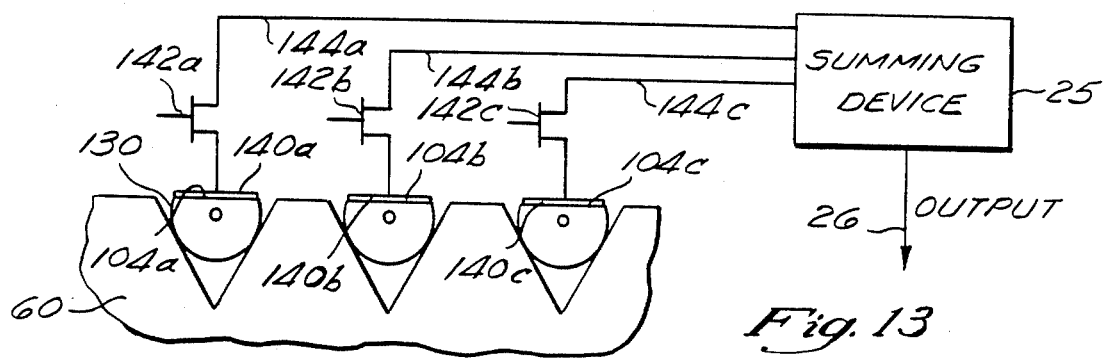
Figure 14:
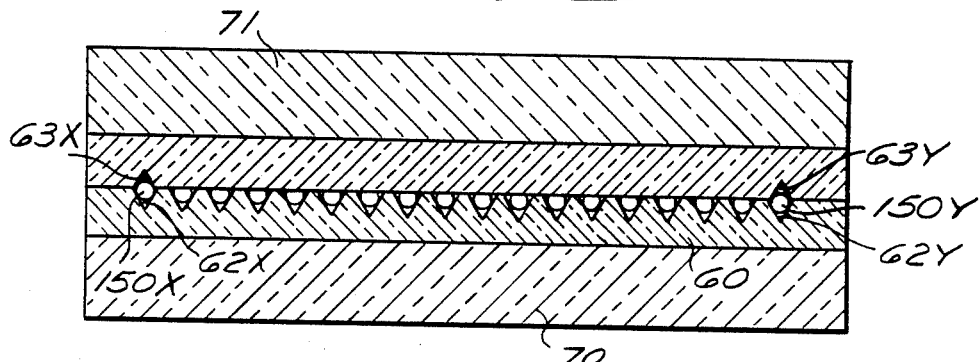
Figure 15:
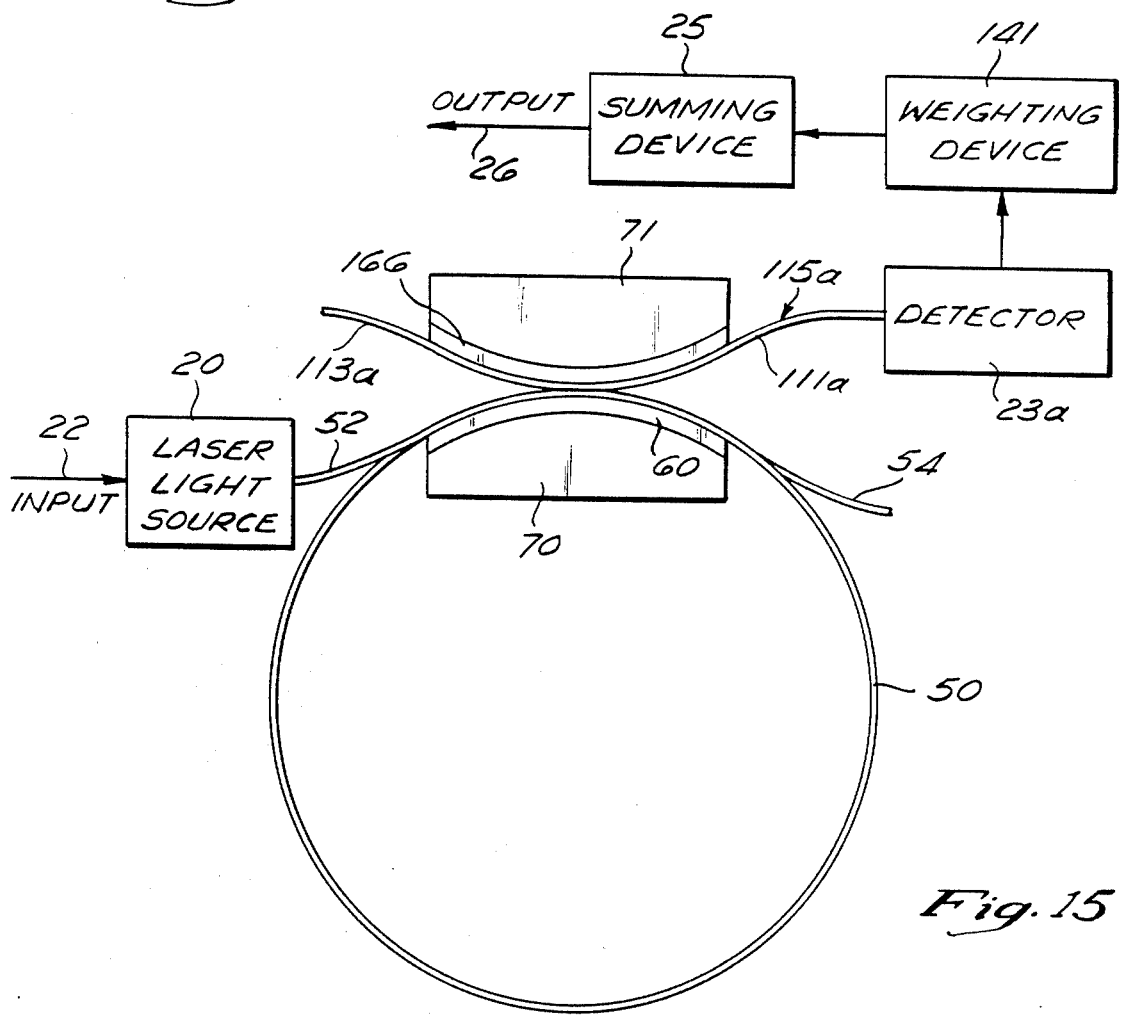
Figure 16:
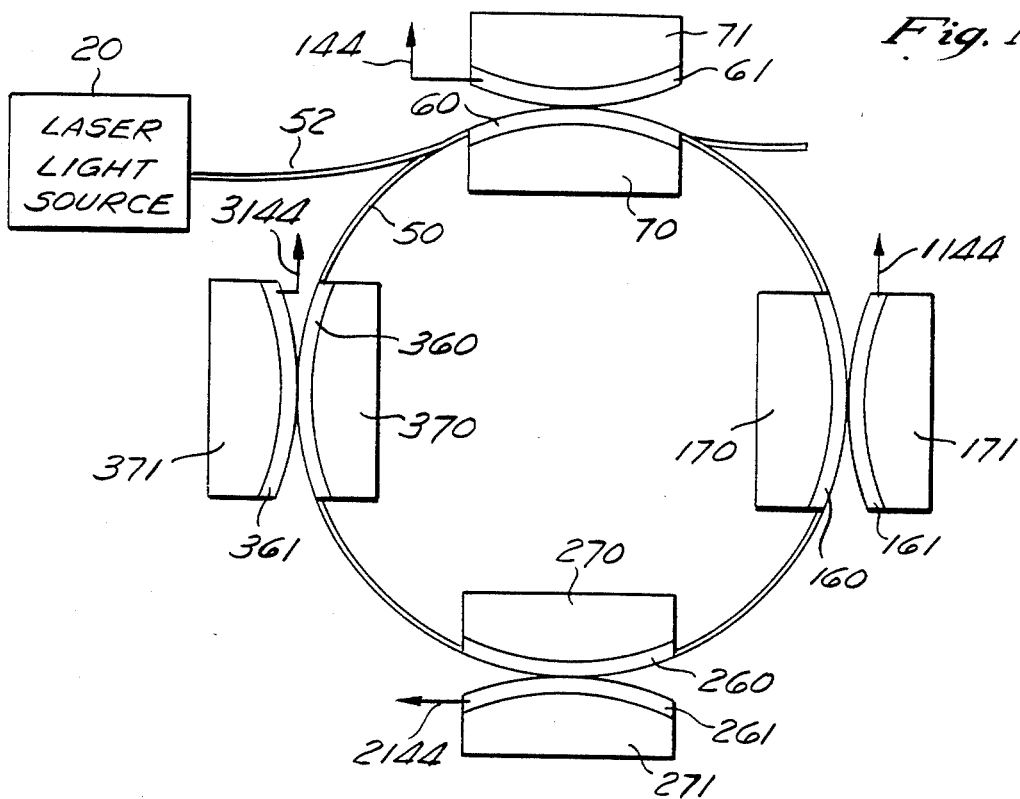
Figure 17:
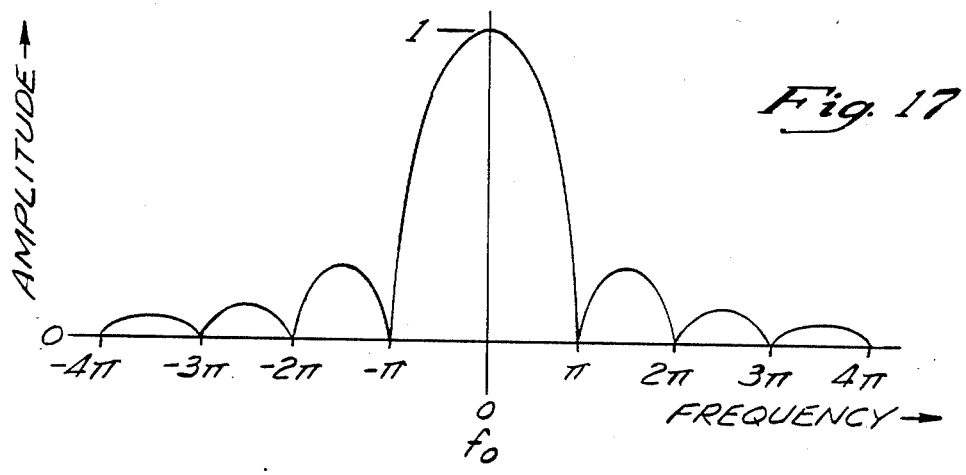
Figure 18:
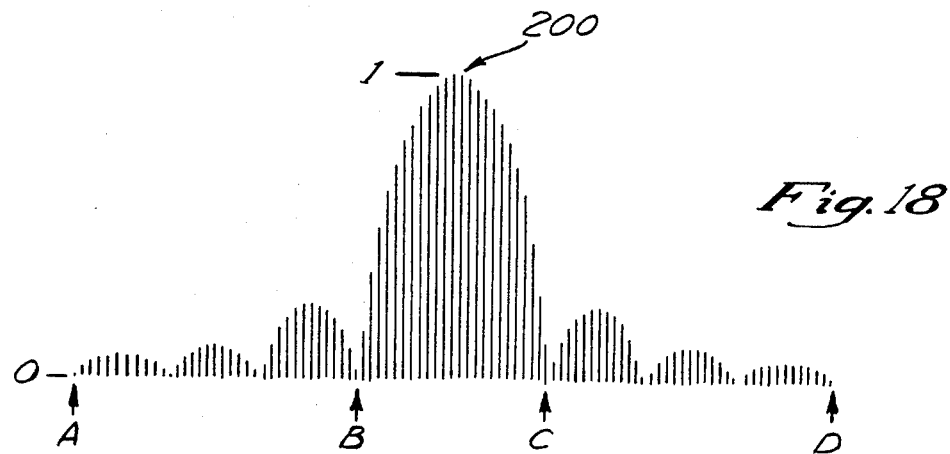

FIG. 13 schematically shows the photodetector apparatus of the preferred embodiment for detecting light in several windings of optical fiber, weighting the output of each photodetector, and summing the outputs;

FIG. 14 is a cross-sectional view of the apparatus used to construct the preferred embodiment of FIG. 13, illustrating the technique used for alignment;

FIG. 15 illustrates an alternative embodiment utilizing the simultaneous manufacture of multiple couplers, which are used to detect light from the various taps in the tapped delay line;

FIG. 16 illustrates a technique using the preferred embodiment of the invention for the detection of higher frequency functions;

FIG. 17 is a weighting function used to produce a rectangular passband transversal filter; and FIG. 18 is a graph of the weighting of a number of taps using the weighting function of FIG. 17.

DETAILED DESCRIPTION OF THE PREFERRED EMBODIMENT

The basic concept of the tapped delay line is to sample a signal simultaneously at a multiplicity of points in the transmission medium the signal is traveling in. When the tapped delay line is acting as a transversal filter, all of the samples are taken at a multiplicity of points on the transmission medium. The distance between these points determines the fundamental frequency of the device. All of the samples are then summed to provide a signal comprising the system-set fundamental and harmonic frequency content of the input signal. All other frequencies will be attenuated by the device. Generally, the greater the number of taps, or points at which the input signal is sampled, the more accurate will be the desired filter characteristics.

Fiber optic devices intended for use as filters have had one significant problem—it has been quite difficult to get a fairly large number of taps at which samples of the signal traveling in the fiber may be taken. The only fiber optic device which has succeeded in providing a fairly high number of taps is the device shown in FIG. 1, and it is not a true tapped delay line since it utilizes a large number of fibers of different length rather than taps. An input signal 22 is modulated onto a light signal provided by a laser light source 20. The output signals are supplied to n optical fibers, which are numbered 40a, 40b, 40c, . . . , 40n. Each succeeding fiber is longer than the previous fiber by a distance L, where L is the length of fiber that will provide a time delay equal to the period of the desired fundamental frequency of the transversal filter. The output ends of each of these filters 40a, 40b, 40c, . . . , 40n are supplied to a detector and summer 24, which sums all of the outputs from the fibers 40 and provides an output 26, which comprises the system-set fundamental and harmonic frequency content of the input signal 22.

The device shown in FIG. 1 is bulky and inconvenient, since it requires one optical fiber segment for each of the taps desired. The present invention overcomes the disadvantages of the device shown in FIG. 1 in that it can have a fairly large number of taps which are constructed simultaneously from a single length of optical fiber, thus minimizing the time, expense, and difficulty of construction of the tapped delay line.

Figure 5:
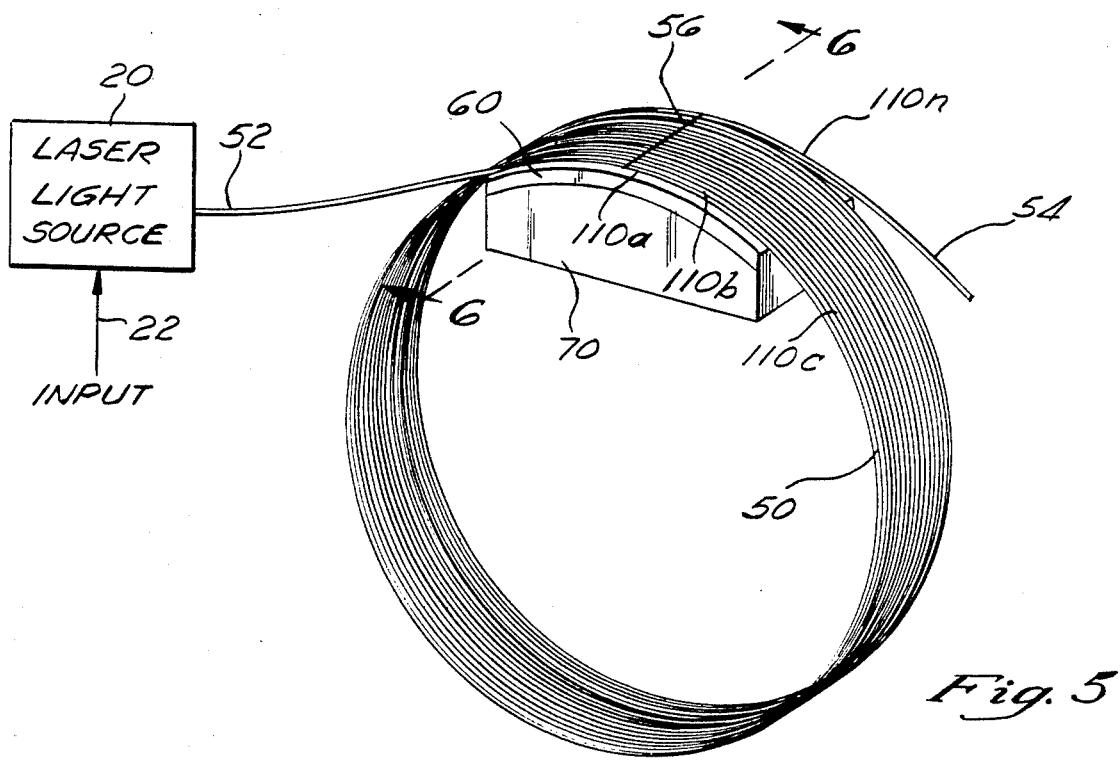
FIG. 5 shows the input stage of the preferred embodiment of the present invention.

The basic concept of the invention is illustrated best in FIG. 5, which shows the input side of the invention. A single segment of optical fiber 50 is used, beginning at the input end 52, which is supplied with a light input signal from a laser light source 20, and ending at an output end 54. The optical fiber 50 is wound around a chip 60 with v-grooves to receive the optical fiber 50. The optical fiber 50 is wound around the chip 60 n times, with the portion of the fiber on the chip at the first winding being 110a, the portion of the fiber 50 mounted on the chip in the second winding being 110b, and so on. At the lateral line 56 normal to the fiber segment axes, taps are constructed so that each revolution of the optical fiber 50 is tapped at the lateral line 56. Before a description of the construction of the taps on the optical fiber 50, it is necessary to describe the construction of the chip 60 and the manner by which the optical fiber 50 is laid in the v-grooves in the chip 60.

In FIG. 2, a portion of the chip 60 with the completed v-grooves is shown. It is desirable that each of these v-grooves be identical in width and depth, since the fibers are to be coplanar because the taps in the fibers in these v-grooves will be constructed simultaneously. If the v-grooves are identical, the taps on the fibers will have uniform characteristics.

Because of this need for great precision in the construction of the v-grooves, the preferred material for the chip 60 is silicon, which can be etched by photolithographic techniques, rather than some other material in which grooves are machined. The type of silicon used is commercially available 100 oriented silicon, because when the surface of this type of silicon is subjected to an etching solution, the surface dissolves at an angle theta, as shown in FIG. 2. For 100 oriented silicon the angle theta is 54.74 degrees.

Therefore, in order to make the v-grooves shown in FIG. 2 in the silicon chip 60, the following photolithographic method may be used. The chip is first heated so that a very thin oxide layer 66 will cover the chip 60, as shown in FIG. 3. The chip is then coated with a photosensitive coating 68 known as photoresist. A mask 80 is then placed over the chip, and the top of the chip is exposed to ultraviolet light 90. For the mask 80 shown in FIG. 3, positive-acting photoresist is used, so the portions of the photoresist 68 under the opaque sections of the mask 80 will be left to perform the masking function.

The next step is to etch away the photoresist 68 and oxide layer 66 which were under the non-opaque portions of the mask by using a buffered hydrochloric acid solution. The remaining photoresist is then stripped by use of a special solvent, and the chip 60 will appear as it does in FIG. 4, covered by a mask of the oxide layer 66. The anisotropic silicon wafer is then placed into an etching solution, commonly potassium hydroxide solution. The portions of the chip not covered by the oxide layer 66 will then be dissolved by the etching solution at an angle of 54.74 degrees from the surface 64 of the chip 60. The etch will develop as a flat-bottom groove until the two angled planes intersect and a true v-groove is formed, as shown in FIG. 2. This photolithographic technique is well-known in the art, and has been used extensively in the manufacture of semiconductors.

The size of the groove to be etched in the silicon chip 60 of course depends on the optical fiber being used. There are two widely-used types of single mode optical fiber, one manufactured by ITT which has a diameter of about 80 microns (400 microns including the plastic jacket), and a second brand of fiber manufactured by Corning which is 125 microns in diameter (135 microns with the lacquer jacket). Which of these or other fibers is used depends on the wavelength of the light to be used; if visible light is to be used, the ITT fiber is acceptable since it is single mode at visible light wavelengths (longer than green); and if infrared light is to be used, the Corning fiber is acceptable since it is single mode at infrared wavelengths.

There are at least four different techniques for constructing optical taps using v-grooves in the silicon chip 60. Through extensive experimentation, it has been determined that one of these techniques is superior to the other three, and that technique will be described first.

Referring now to FIG. 5, in order to construct an optical tap, it is desirable to have the optical fiber surface to be tapped mounted in a curved configuration so that a flat portion of the optical fiber may be lapped to provide a tap of the light traveling within the fiber. Therefore, the silicon chip 60 is mounted on a block of quartz 70 which has a curved upper surface. It has been found that a silicon chip of standard thickness (0.25 millimeter) and about three-centimeter length can be bent without breaking around a twelve-inch radius. An adhesive substance such as wax is used to hold the silicon chip 60 on the quartz block 70 in the curved configuration shown in FIG. 5. The optical fiber 50 may now be mounted on silicon chip 60.

Before the optical fiber 50 can be mounted in the v-grooves in the silicon chip 60, the portions of the optical fiber 50 which are to be mounted in the v-grooves preferably have the protective jacket removed. The ITT fiber has a plastic jacket which may be removed by dipping it in sulfuric acid. The resiliency of the plastic jacket prevents precision in the lapping operation, so it should be removed. The Corning fiber has a lacquer jacket which may be removed by dipping it in acetone. Since the lacquer jacket is more solid than the plastic jacket, its removal is preferential rather than mandatory.

Figure 6:
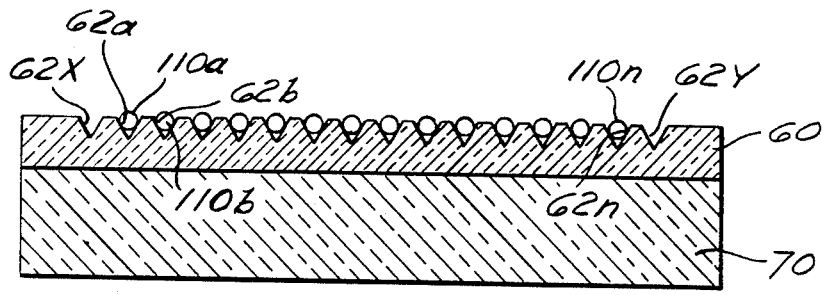
FIG. 6 is a cross-sectional view of the device shown in FIG. 5, showing the windings of optical fiber aligned in the v-grooves.
Figure 7:
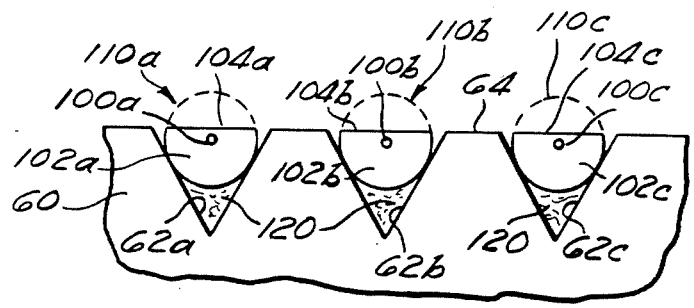
FIG. 7 is an enlarged view of a portion of FIG. 6 showing the optical fibers mounted in the v-grooves and lapped.

The installation of the fiber 50 in the v-grooves of the silicon chip 60 is best shown in FIGS. 6 and 7. A portion of the optical fiber 50 near the input end 52 of the fiber 50 is mounted in the second v-groove 62a of the silicon chip 60. It should be noted that there is a first v-groove 62x, as shown in FIG. 6, which is not used to receive the optical fiber 50, but rather for alignment purposes. The portion of the optical fiber 50 which is to be placed in the v-groove 62a is numbered 110a, and before it is mounted in the v-groove 62a, an adhesive substance 120 is placed in the bottom of the v-groove 62a. Therefore, when the portion 110a of the optical fiber 50 is placed in the v-groove 62a and the optical fiber 50 bottoms out against the sides of the v-groove 62a, it will be permanently retained there by the adhesive 120.

Following the placement of portion 110a of the optical fiber 50 in the first v-groove 62a, a length L of the optical fiber is left between the center of the portion 110a and the center of the second portion 110b of the optical fiber 50, which is to be mounted in the second v-groove 62b (FIG. 5). This length L, as defined above, is the length of optical fiber which will provide a delay time equal to the period of the desired fundamental frequency of the device. Therefore, it can be seen that the optical fiber 50 is wound around the silicon chip 60 so that upon each successive revolution it is fitted into the next succeeding v-groove, and secured by the adhesive 120, as shown in FIG. 5. When the last portion 110 of the optical fiber 50 has been fitted into the last v-groove 62n of the silicon chip 60, the optical fiber 50 terminates at end 54, as shown in FIG. 5.

Figure 8:
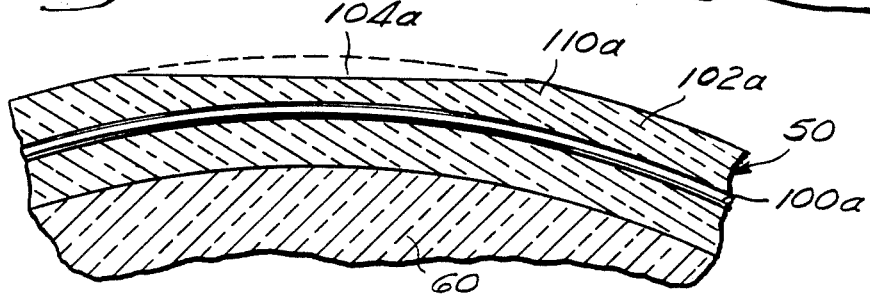
FIG. 8 is a cross-sectional view of the first winding of optical fiber mounted in the v-grooves illustrating how the fiber is lapped.

The next step is to lap the upper surface of the portions 110 of the optical fiber 50 at the lateral line 56, the portions 110 of the optical fiber 50 being mounted in the silicon chip 60. This lapping operation will remove a portion of the cladding 102, as best shown in FIG. 7. It is important to note that not all of the cladding material 102 around the core 100 of the optical fiber 50 is to be removed. The distance between the core 100 and the lapped surface 104 of the fiber 50 depends on the amount of light which is to be removed from the fiber at each tap. When small amounts of light are being extracted, the closer the lapped surface 104 is to the core 100 of the fiber 50, the more light is extracted from the fiber 50 at that tap. Since it is desirable for our application to have a fairly high number of taps, only a small amount of light will be removed at each tap. Therefore, between approximately five and ten microns of cladding will be left between the lapped surface 104 and the core 100 of the fiber 50. A longitudinal cross sectional view of the lapped optical fiber is shown in FIG. 8.

Figure 9:
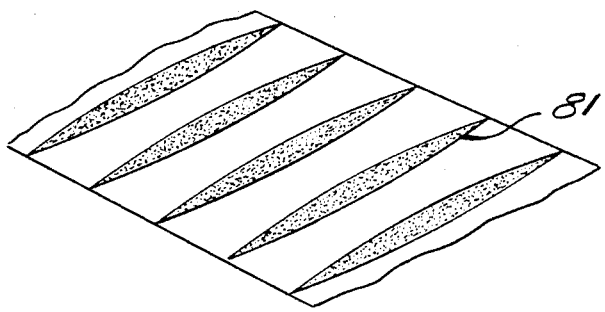
FIG. 9 is a perspective view of a mask used in the photolithographic process for an alternative embodiment.
Figure 10:
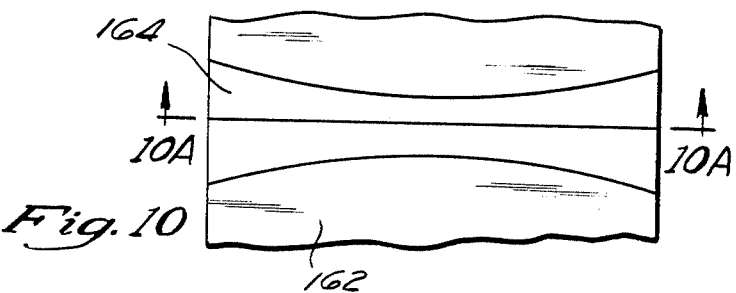
FIG. 10 is a top view of a v-groove in a wafer manufactured using the mask shown in FIG. 9.
Figure 10A:
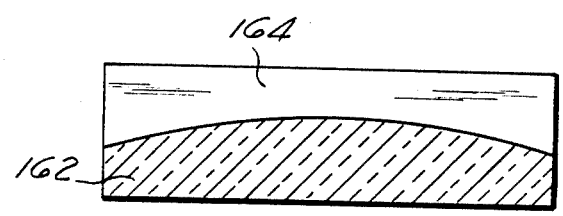
FIG. 10A is a cross-sectional view of the v-groove shown in FIG. 10.

Before proceeding to the description of the detection of light emitted from the optical tap, the three alternative methods for manufacturing the tap itself will be described. First, instead of using a quartz block 70 with a curved surface, the silicon chip may have curved v-grooves cut into it, as shown in FIGS. 10 and 10A. In order to have such curved v-grooves, a mask 81 such as that shown in FIG. 9 is used. Because the silicon chip will be etched at a 54.74 degree angle from the surface of the chip, a wider v-groove will then be cut at the edges of the chips tapering to the normal width in the center of the chip 162, and since the depth of the v-groove is proportionate to the width of the v-groove, it will be deeper at the ends than it will be in the center, thus resulting in the curved v-groove 164 shown in FIGS. 10 and 10A.

While this technique somewhat simplifies the construction of the curved v-grooves necessary for the optical taps, it does have several problems. First, the photolithographic technique utilizes very small steps rather than a uniform curve in the preparation of the mask 81. This limitation is caused by the fact that the mask 81 is prepared in digital steps instead of in an analog curve. Therefore, the resulting v-groove will also contain these very small steps, and this leads to the possibility of microbending losses when the optical fiber 50 is installed into the v-grooves. Another problem is that the silicon wafer used is fairly thin, and if the v-grooves have too much depth, they could substantially weaken the strength of the silicon wafer. Thicker silicon chips are generally not of the uniform thickness required for the precise mounting of the fiber 50. Finally, since the deeper portions of the v-grooves at the edges of the silicon chip 50 are formed by making the v-grooves wider at the edges, the minimum distance between v-grooves must necessarily be greater for this embodiment, thus making the overall size of the tapped delay line larger. Because of these problems, the first technique described above is preferred over the curved v-groove technique.

Figure 11:
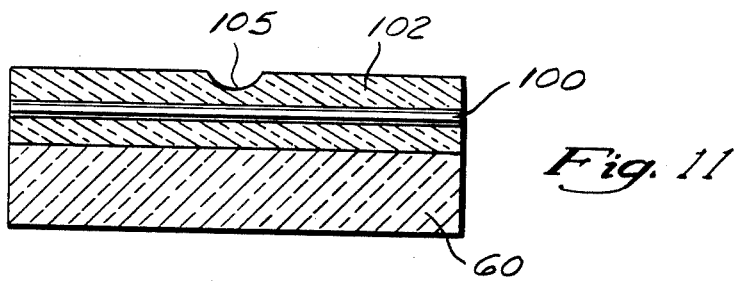
FIG. 11 is a cross-sectional view of one of the windings of optical fiber in a v-groove illustrating an alternative embodiment utilizing rotary wrapping.

A second possible method of constructing the optical taps in the fiber also does not require bending of the silicon chip 60. This method, shown in FIG. 11, utilizes radial lapping techniques. A cylindrical tool (not shown) is used to lap the fiber 50, removing the curved portion 105 from the cladding 102 of the fiber 50. This does have the advantage of localizing the loss, but it is not the preferred embodiment, in part because it is not usable with both of the methods for measuring the tapped outputs described below.

Figure 12:
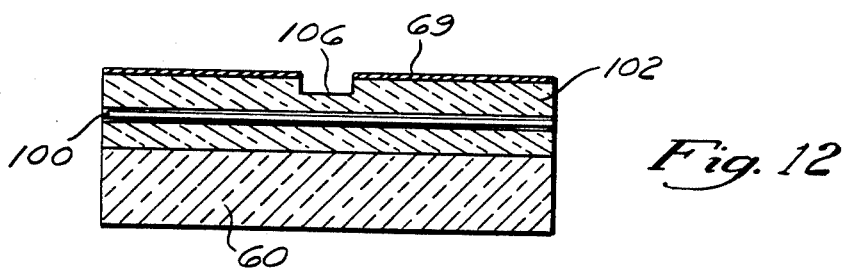
FIG. 12 is a cross-sectional view of one of the windings of optical fiber in a v-groove illustrating an alternative embodiment using a photolithographic etching process to cut into the cladding of the optical fiber.

The third alternative method for tapping portions of the fiber 50 to remove light is shown in FIG. 12. Photolithographic techniques are used with chemical or plasma etching, whereby a mask of photoresist 69 is placed on the surface of the portions of the optical fiber 50 resting in the v-grooves of the silicon chip 60. A gap is provided in the photoresist mask 69 along the line 56 (not shown in FIG. 12). Thus, when the chemical etch or plasma etch process occurs a portion of the cladding 102 will be removed, creating an optical tap at the point 106 where the cladding is removed. This method is not the preferred embodiment because it is quite difficult to accomplish, since it requires repeatedly checking the amount of light removed by the tap while the etching process is being performed.

There are two techniques used for detecting and measuring the signal at the multiple tap locations. The first of these two techniques discussed below is the preferred embodiment, and the second technique discussed below, while not the preferred embodiment, is of great significance in that it may be used for mass production of optical coupling devices.

The first technique is schematically illustrated in FIG. 13. Three portions of the optical fiber 50 in the v-grooves are shown. The lapped surfaces of these three portions 104a, 104b, and 104c have photosensitive electronic devices 140a, 140b, and 140c, respectively, installed in a position whereby the light tapped from the fiber 50 at each tap location is measured by the photosensitive devices 140a, 140b, and 140c. The outputs of these photosensitive devices 140a, 140b, and 140c are connected to field effect transistors (FETs) 142a, 142b, and 142c, respectively. The FETs 142a, 142b, and 142c are used to weight the various taps by varying the gate potential of the FETs 142a, 142b, 142c, and they may also be used to compensate for losses occuring in the fiber for taps which are nearer the end of the optical fiber 50.

The output 144a, 144b, and 144c of the FETs 142a, 142b, and 142c, respectively, as well as the outputs 144 of the other tap locations, are supplied to a summing device 25, which provides an output 26 comprising the system-set fundamental and harmonic frequency content of the input signal 22, all other frequencies being attenuated. Preferably, the photosensors 140 and the FETs 142 are manufactured on a second silicon chip 61 so that when the two chips 60, 61 are placed together as shown in FIG. 14, the tapped delay device is completed. If necessary, an index matching medium 130 such as index oil may be used between the lapped portions 104 of the optical fiber 50 and the photosensors 140, as shown in FIG. 13.

FIG. 14 shows that the two additional v-grooves 62x and 62y in the silicon chip 60, and two v-grooves 63x and 63y in the second silicon chip 61 are used for correctly mounting the two chips together. Two pins 150x and 150y fit in the corresponding pairs of v-grooves 62x and 63x, 62y and 63y, respectively, to insure proper alignment. If desired, the second silicon chip 61 may also be mounted on a quartz block 71.

The second embodiment of the output stage involves taking a number of segments of optical fiber 111a, 111b, 111c, . . . 111n and mounting them in v-grooves in a second silicon chip 166 which is identical to the chip 60, and then lapping the surfaces of the optical fiber 111 as described above. The two silicon chips 60 and 166 are then placed in proximity, alignment being aided by the pins 150x and 150y shown in FIG. 14, and optical couplers are formed. These optical couplers operate on the principles described in co-pending patent application Ser. No. 300,955, filed Sept. 10, 1981, entitled "Fiber Optic Directional Coupler," and assigned to the assignee of the present invention. That co-pending patent application is hereby incorporated herein by reference. The output ends of the optical fibers 111 are then supplied to detectors 23, which supply a corresponding electrical signal to weighting devices 141, the outputs of which are summed by a summing device 25 to provide an output 26.

It may be immediately recognized that this device is more complex and difficult to manufacture than the preferred embodiment described above. However, it is extremely significant in that by using the v-grooves—silicon chip technology, a large number of optical couplers may be simultaneously fabricated. These couplers could then be split into individual couplers, each with four ports as in the above-referenced case, and sold individually. One method for splitting the couplers would be to cut the first and second silicon chips to separate the optical couplers.

It will be recognized that the upper limitation on frequencies which may be filtered by a transversal filter using the above described tapped delay line is determined by the minimum length of the optical fiber 50 between tap locations. One way to increase the system-set fundamental frequency is to decrease the length L of the fiber 50 between tap locations, but this is limited since the fiber 50 may not be kinked without substantial losses. In FIG. 16, a device is shown which uses four of the tapped units described above. Since this in effect reduces the length L at which interval sampling of the signal occurs to L/4, the maximum frequency which may be measured is increased by a factor of four due to the proportionately-decreased time at which samples are taken.

Weighting the outputs of a tapped delay line to vary the response of the system is performed by attenuating to some extent the outputs of selected individual taps. The weighting controls inherent in tapped delay line of the present invention enable the fundamental frequency of the transversal filter to be varied to a fairly considerable extent by dropping a number of taps out completely to lower the fundamental frequency of the transversal filter. For example, by dropping every other tap by weighting these taps at zero, the fundamental frequency is halved. Another advantage of the ability to weight each tap individually is that loss in signal strength near the end of the tapped delay line may be compensated for by the weighting controls.

The weighting controls also allow the passband of a filter to be tailored; for example, in a transverse filter, the passband may be sharpended and narrowed so that it is nearly rectangular rather than only a relative approximation of a rectangular passband with harmonics. If the taps are weighted equally (or not weighted at all), the frequency response of the device is $|\sin(x)/x|$, as shown in FIG. 17. The fundamental frequency is centered at $f_o$, with the passband being between $-\pi$ and $\pi$ from the fundamental frequency $f_o$.

Since it is desirable to obtain a more rectangular passband and to eliminate the side frequency nodes, weighting of the taps is desirable. In FIG. 18, the preferred weighting of a 67-tap tapped delay line using FETs 140 to provide the weighting is described by a graph showing the weighting of the 67 taps. The center tap 200 is not weighted at all, so the entire electrical signal from the photodetector 140 is passed by the FET 142 to the summing device 25. The taps to each side of the center tap 200 are weighted by the FET 142 for each tap to the extent indicated by FIG. 18, with the amount each line representing a tap is diminished from 1.0 being the amount of attenuation given to that particular tap. This weighting will produce the desired more nearly rectangular passband.

If a greater number of taps are weighted in the area between B and C in FIG. 18, the passband will become more and more narrow, centered on the fundamental frequency determined by the length L between taps. Alternatively, if fewer taps are weighted in the B to C curved area, the passband is wider.

The shape of the passband is determined by the number of taps used in a weighting function approximating the side nodes, three of which are shown on each side of the center curve (B to C), these nodes being the A to B and C to D areas. Generally, the greater the number of these side nodes that are produced be weighting the taps, the sharper and more rectangular will be the passband. Thus, it can be seen that passbands of various shapes may be custom-tailored using various weighting functions on the taps.

The advantages of the present invention over earlier tapped delay lines are impressive. The optical tapped delay line is operable at frequencies much higher than are wave phenomena devices or electrical devices. The device is not subject to electromagnetic interference. Probably the most notable advantage of this tapped delay line is that a relatively large number of identical optical taps may be quickly, conveniently, and inexpensively constructed in a single compact unit. Since each of the taps only removes a very small portion of the signal, the number of effective taps which may be obtained is considerably higher than that of a recirculating type tapped delay line transversal filter. The ability to custom tailor the outputs by using the weighting controls allows the precise shape of the passband to be made into an accurate shape with the desired frequency characteristic. Finally, the v-groove—silicon chip technology disclosed allows identical coupling devices to be manufactured in large quantities for commercial sale.

What is claimed is:

1. A tapped optical fiber delay line for sampling a light signal supplied to said tapped delay line, comprising:

a single mode optical fiber having an input end portion and an output end portion, said fiber providing a continuous optical path between the input and output portions so as to define a delay line;

a base forming a platform for holding multiple segments of said fiber, each of said fiber segments being mounted on said base;

multiple taps in said multiple fiber segments, each of said taps comprising a portion of a fiber segment at which the cladding of said optical fiber has been removed to a predetermined distance above the core of said fiber, and each of said fiber segments forming a delay line segment between respective ones of said taps; and means for detecting light at said multiple taps in said delay line.

2. A tapped optical fiber delay line as defined in claim 1, wherein said base includes a surface with multiple recesses in said surface, said recesses mounting said multiple segments of optical fiber.

3. A tapped optical fiber delay line as defined in claim 2, wherein said recesses are parallel v-grooves of uniform width and depth.

4. A tapped optical fiber delay line as defined in claim 3, wherein said base is made of 100-oriented silicon, and said v-grooves conform to the crystalline planes within said silicon.

5. A tapped optical fiber delay line as defined in claim 4, wherein the surface of said base is in a curved configuration causing said v-grooves to be curved v-grooves.

6. A tapped optical fiber delay line as defined in claim 5, further comprising means for summing the light detected at the multiple taps to produce an output signal comprising the system-set fundamental and harmonic frequency content of the input signal.

7. A tapped optical fiber delay line as defined in claim 4, wherein said taps comprise portions of said fiber segments at which a curved notch portion of the cladding is removed.

8. A tapped optical fiber delay line as defined in claim 2, wherein said recesses are parallel v-grooves which are wider and deeper near the sides of said base than in the center of said base.

9. A tapped optical fiber delay line as defined in claim 8 wherein the base has an anisotropic structure which permits etchable formation of the V-grooves in the surface of the base.

10. A tapped optical fiber delay line as defined in claim 1, wherein said means for detecting light are photoelectric devices.

11. A tapped optical fiber delay line as defined in claim 10, wherein said photoelectric devices are mounted on a second silicon base.

12. A tapped optical fiber delay line as defined in claim 11, additionally comprising:
alignment pins for placement between v-grooves in said base and v-grooves in said second silicon base, said alignment pins providing positive alignment of said base and said second base.

13. A tapped optical fiber delay line as defined in claim 1, wherein said means for detecting light detects a light signal supplied to said tapped delay line at each tap location.

14. A tapped optical fiber delay line as defined in claim 13, additionally comprising:
means for summing the light detected at all tap locations to produce an output signal.

15. A tapped optical fiber delay line as defined in claim 1, wherein said means for detecting light comprises:
multiple output lengths of optical fiber;
a second base comprising a substrate having an anisotropic structure which permits etchable formation of v-grooves in the surface of said substrate, said v-grooves being oriented in a substantially common planar direction for receiving said multiple output lengths of fiber, said second base being identical to said base, wherein a portion of the cladding of said output fibers is removed.

16. A tapped optical fiber delay line as defined in claim 15, additionally comprising:
alignment pins between v-grooves in said base and v-grooves in said second base, said alignment pins providing positive alignment of said base and said second base.

17. A tapped optical fiber delay line, as defined by claim 1, wherein said multiple fiber segments are mounted along arcuately curved paths on said base, said taps being formed by removing cladding exclusively from a portion of the segments of the single mode fiber intermediate the ends of the arcuately curved paths.

18. A tapped optical fiber delay line, as defined by claim 17, wherein said base is formed of an anisotropically etchable material.

19. A tapped optical fiber delay line, as defined by claim 1, wherein said means for detecting light comprises second multiple fiber segments having multiple taps in optical communication with the multiple taps of said multiple fiber segments.

20. A tapped optical fiber delay line, as defined by claim 19, wherein said second multiple fiber segments are monted on a second base disposed adjacent to said base.

21. A tapped optical fiber delay line as defined in claim 1, wherein said taps extract less than 3% of a light signal traveling in said fiber at the location of said taps.

22. A tapped optical fiber delay line as defined in claim 1, wherein additional bases are used to hold portions of said fiber between each of said successive multiple segments, each of said additional bases having additional taps in said fiber and additional means for detecting light from said additional taps.

23. A tapped optical fiber delay line as defined in claim 1, wherein the base comprises a substrate having an anisotropic structure which permits etchable formation of grooves in the surface thereof oriented in a common planar direction.

24. A tapped optical fiber delay line for sampling a light signal supplied to said tapped delay line, comprising:
a base having a curved surface;
a thin, flat substrate having a plurality of substantially parallel grooves formed in the surface of the substrate, wherein the substrate is mounted on a curved surface of the base so that the thin, flat substrate follows the contours of the curved surface and the grooves define curved paths which are substantially parallel to the adjacent curved surface of the base; and
a single length of single mode optical fiber having a plurality of segments which are mounted in the plurality of grooves so as to form a delay line, wherein cladding is removed from a portion of the segments to produce optical taps in said segments.

25. A tapped optical fiber delay line as defined in claim 24 wherein at least the surface of the substrate has an anisotropic structure which permits etchable formation of V-grooves in the surface of said substrate.

26. A tapped optical fiber delay line as defined in claim 25 wherein the substrate comprises silicon having a 100 crystal lattice structure.

27. A tapped optical fiber delay line as defined in claim 24 wherein the substrate comprises a wafer of anisotropic material.

28. A tapped optical fiber delay line as defined in claim 24 wherein the base comprises quartz.

29. A tapped optical fiber delay line for sampling a light signal supplied to said tapped delay line, comprising:
 a length of single mode optical fiber;
 a base forming a platform for holding multiple segments of said fiber, each of said fiber segments being mounted at a predetermined height by said base;
 multiple taps in said multiple fiber segments, each of said taps comprising a portion of a fiber segment at which the height of said optical fiber has been reduced to a predetermined distance above said base, and wherein the length of said fiber between adjoining tap locations in said segments is equal;
 means for detecting a light signal supplied to said tapped delay line at each tap location; and
 means for summing the light detected at all tap locations to produce an output signal comprising the system-set fundamental and harmonic frequency content of the input signal, the system-set fundamental frequency being that frequency having a period equal to the time required for a signal to travel said equal length between adjoining tap locations.

30. A tapped optical fiber delay line as defined in claim 26, wherein said means for detecting light comprises plural detectors, each of which detects a light signal at an individual tap location, and may weight the light signal detected by a multiplied factor between zero and one.

31. A tapped optical fiber delay line as defined in claim 29, wherein the base comprises a substrate having an anisotropic structure which permits etchable formation of grooves in the surface thereof oriented in a common planar direction.

32. A method of manufacturing taps on an optical fiber comprising the steps of:
 providing a thin, substantially flat wafer, for forming a substrate upon which optical fibers may be supported;
 forming a plurality of grooves in the surface of the wafer, said grooves being substantially parallel;
 securing the thin wafer upon a curved surface of a base so that the wafer follows the curved contour of the curved surface and the grooves in the wafer define curved paths;
 mounting multiple segments of single mode optical fiber in the plurality of grooves; and
 simultaneously removing cladding from a portion of the single mode optical fiber segments to produce optical taps in said segments.

33. A method of manufacturing taps as defined in claim 32 wherein said wafer is formed of an anisotropic material, and wherein the step of forming a plurality of grooves comprises the step of etching the surface of the wafer to form V-grooves therein.

34. A method of manufacturing taps on an optical fiber as defined in claim 33, wherein the wafer comprises silicon having a 100 crystal lattice structure.

35. A method of manufacturing taps on an optical fiber as defined in claim 34 wherein the second material comprises quartz.

36. A method of manufacturing taps on an optical fiber as defined in claim 32 wherein the step of simultaneously removing cladding from a portion of the segments comprises the step of simultaneously lapping an upper surface of the segments of optical fiber so as to remove cladding from a portion of each segment.

37. A tapped optical fiber delay line for sampling a light signal, comprising:
 a single length of single mode optical fiber, with multiple segments of said length of optical fiber being maintained in a common planar and parallel position so as to define a delay line;
 multiple optical taps fabricated in said multiple segments, each of said taps removing a portion of light traveling in said fiber;
 means for detecting a light signal at said taps; and
 means for summing the light detected at said taps to produce an output signal.

38. A tapped optical fiber delay line as defined in claim 37, wherein the optical fiber is fixedly mounted at each of the taps on a substrate having an anisotropic structure which permits etchable formation of grooves in the surface of said substrate, said grooves being oriented in a common planar direction.

39. A method of manufacturing couplers, comprising:
 mounting multiple first segments of single mode optical fiber into multiple parallel arcuate recesses on a first base;
 gradually longitudinally removing cladding simultaneously from a portion of said first segments to simultaneously produce an optical tap in each of said first segments;
 mounting multiple second segments of single mode optical fiber into parallel arcuate recesses on a second base;
 gradually, longitudinally removing cladding simultaneously from a portion of said second segments to simultaneously produce an optical tap in each of said second segments;
 juxtaposing plural ones of the optical taps with plural others of the optical taps, thereby creating a multiplicity of optical couplers; and
 cutting said bases to separate a plurality of the optical taps.

40. A method of manufacturing a tapped delay line, comprising:
 providing an anisotropically etchable substrate;
 etching a surface of the substrate to form a plurality of substantially parallel grooves therein;
 mounting segments of a single length of single mode optical fiber in the grooves so as to define a delay line, said segments being mounted in a fixed position;
 removing a portion of cladding from the segments of the optical fiber to form optical taps in said segments, the size of said taps being determined by reference to said base; and
 positioning means for detecting light in optical communication with said optical taps, thereby providing for detection of light at said optical taps.

* * * * *